(12) United States Patent
Biary (10) Patent No.: US 7,161,343 B1
(45) Date of Patent: Jan. 9, 2007

(54) WALL STUD LOCATOR AND MARKER

(76) Inventor: Sohail Biary, 29040 Marilyn Dr., Canyon Country, CA (US) 91387

( * ) Notice: Subject to any disclaimer, the term of this patent is extended or adjusted under 35 U.S.C. 154(b) by 112 days.

(21) Appl. No.: 10/888,253

(22) Filed: Jul. 9, 2004

(51) Int. Cl.
G01R 19/00 (2006.01)
G01R 33/12 (2006.01)
G01V 3/08 (2006.01)

(52) U.S. Cl. .................................. 324/67; 324/228
(58) Field of Classification Search ............. 324/67, 324/228
See application file for complete search history.

(56) References Cited

U.S. PATENT DOCUMENTS 3,845,384 A * 10/1974 Stoutenberg et al. ....... 324/228
4,813,168 A * 3/1989 Romer-Nygaard ........... 40/621
4,896,131 A 1/1990 Podlesny
5,138,761 A * 8/1992 Schonstedt ................. 29/602.1
5,148,108 A * 9/1992 Dufour ....................... 324/226
6,087,824 A 7/2000 Shiao
6,229,294 B1 * 5/2001 Wun .......................... 324/67
6,674,276 B1 * 1/2004 Morgan et al. ............... 324/67

\* cited by examiner

*Primary Examiner*—Bot LeDynh
(74) *Attorney, Agent, or Firm*—Colin P. Abrahams (57) ABSTRACT

A locator and marking apparatus comprises a housing and a surface on the housing for holding a magnet to be dispensed. Spacer members are formed on the housing such that the surface for holding the magnet is maintained a substantially predetermined distance from a substrate on which the locating and marking apparatus is positioned.

20 Claims, 9 Drawing Sheets

WALL STUD LOCATOR AND MARKER

FIELD AND BACKGROUND OF THE INVENTION

This invention relates generally to a wall stud locator and marker. More specifically, the invention is directed towards a device which can be used on a wall or other relevant surface, and which can, through the use of magnets, identify and locate metal objects, such as screws, nails, tacks or the like, in the wall which are used to secure wooden beams in the framing of walls and other structures. Further, the invention relates to magnetic markers which can be magnetically held on a wall at an area of a nail, screw or the like, for the purposes of marking a spot, or securing an object to the wall. Such an object will typically comprise relatively light objects such as paper, photographs or the like. However, where stronger magnets are used, this may facilitate the ability for the wall stud locator and marker of the invention to hold heavier objects.

An assortment of nail-locating devices are known. For example, U.S. Pat. No. 6,087,824 (Shiao) discloses a nail locating device with a magnet-supporting indicator rod mounted in a bore-socket. The device permits location of a magnetically attractive nail on a non-magnetically attractive board, and comprises a seat, coupling member and an indicating rod.

U.S. Pat. No. 4,896,131 (Podlesny) teaches a stud finder with a one-piece magnetic assembly molded from a plastic material which contains a dopant capable of being permanently magnetized along a desired axis. The magnet assembly has integral pivot bosses for pivotally supporting the magnet assembly in a location where it can be influenced by the nearby presence of magnetic metals, such as nails. The plastic material is capable of accepting integral coloring.

U.S. Pat. No. 5,148,108 (Dufour) shows a stud finder with a level indicator. A magnetic sub-assembly is mounted at one of a base member, and a level vial is mounted at the other end of the base member. A slot is formed in the base member between the magnetic sub-assembly and the level vial. When the device is placed against a wall, and a stud is detected by the magnetic assembly, the base member is moved to a position in which the level vial indicates level. The user can place a vertical mark on the wall through a slot in the device.

U.S. Pat. No. 6,229,294 (Wen) discloses a stud detector which has a measuring member with first and second ends, and a preselected length that corresponds to a conventionally used stud configuration. A sensor is connected to the second end, and includes a magnet which detects the presence of the stud behind the surface of a wall by detecting the presence of a metal object.

U.S. Pat. No. 6,456,053 (Rowley) also shows a metal detector for finding wall studs, including a magnet having a round and smooth outer surface. The magnet is attached to a bead chain, where each bead is able to rotate relative to the next, so that the magnet is free to rotate along its axis with respect to the chain. In use, the magnet is held suspended from the bead chain, and moved across a wall until it detects a metal object within the wall. The magnet then rotates against the wall until it places itself at the center of the object, thus defining the center of a stud or other hidden object.

U.S. Pat. No. 6,696,827 (Fazekas) discloses yet a further type of magnetic stud locator which has an elongate housing having a base portion which defines a planar contact surface, and a handle portion extending from the base portion. The device has a magnet in the base portion, and an attraction surface thereon extends in generally parallel relation to the contact surface.

SUMMARY OF THE INVENTION

According to the invention, there is provided a device for identifying metal objects behind a wall using a magnet, and dispensing a magnet on the wall so that it will remain on the wall through magnetic attraction to the metal object.

Preferably, the device of the invention comprises a housing which carries the magnet in a releasable manner, the housing being especially adapted to slide over a wall and discharge the magnet from the housing when a metal object is detected, the discharged magnet being held on the wall at the area of the metal object.

Further, in accordance with the invention, there is provided a device including a storage container for a storing plurality of magnets, whereby the magnets can be removed from the storage container when needed and placed in the housing for attachment to the wall, and thereafter replaced back in the storage container after use.

Detecting metal objects in the framework or studs behind a wall is well-known, and, as described above, many different types of devices have been developed for this purpose. Typically, in a popular method of building construction, a house, office or other type of construction is framed using vertical, horizontal and sometimes diagonally located wooden beams, all attached to each other to form a sturdy frame for supporting an outer wall. These wooden framing members are typically connected to each other with screws or nails at predetermined intervals, according to a specific pattern. Once the frame has been constructed, sheet material comprising the walls is placed thereover, and the frame is completely hidden.

It sometimes becomes necessary to determine exactly where the frame is behind a wall. This may be necessary for the purposes of securing heavy objects to the wall, since it is desirable to place a screw, plug or other attachment mechanism directly into the wooden frame, as opposed to merely the sheet wall, which often lacks the requisite strength for supporting heavy objects. As such, different stud locators have been developed for this purpose.

In one aspect, the present invention provides a mechanism not only for determining the precise location of a frame member behind the wall, by magnetically locating metal objects used to construct the frame, but also provides markers which can be attached to the wall, the markers being in the form of magnets. These markers have many functions, including locating a metal object and holding its identified position for later use, or just attaching objects, such as photographs, notes, or other objects to the wall. Of course, the nature of the object which can be held against the wall in accordance with the invention will typically be lighter, but increased weight can be supported depending upon the strength of the magnets which may be used, as well as the precise location and size of the metal objects within the wooden frame.

According to one aspect of the invention, there is provided a locator and marking apparatus comprising: a housing; a surface on the housing for holding a magnet to be dispensed; and spacer members formed on the housing such that the surface for holding the magnet is maintained a substantially predetermined distance from a substrate on which the locating and marking apparatus is positioned.

Preferably, the housing further comprises a first recess on the surface, the first recess holding a portion of the magnet to be dispensed. The housing may further comprise a second recess on an opposing surface, the second recess for holding a storage magnet.

In one embodiment, the spacer member comprises a plurality of legs on the surface of the housing for holding the magnet to be dispensed, the spacer members defining a through passage so that no obstacle is formed for a particular movement of the housing with respect to the magnet to be dispensed.

Preferably, a small metal object is placed in the housing near the surface for keeping a magnet to be dispensed in position on the surface prior to discharge thereof.

In one aspect, a lid is formed on the housing, the housing having a storage area for a storage magnet, the lid movable between a closed position wherein the storage magnet is maintained within the housing, and an open position, wherein the storage magnet can be accessed. The surface on the housing may comprise a plurality of recesses, each recess holding a magnet to be dispensed.

A magnet is preferably located for dispensing on the surface of the housing. The magnet preferably has a substantially non-scratching covering over at least a portion of its surface. Further, a plurality of magnets may be provided, and at least some of the magnets are color-coded.

Preferably, the locating and marking apparatus further comprises a storage container, the storage container being adapted to contain a plurality of magnets which can be removed therefrom and placed on the surface of the housing. The storage container may generally be of tubular shape, and may comprise a cover movable between an open position wherein magnets can be accessed, and a closed position where the magnets are sealed therein. In one embodiment, the cover of the storage container contains a small magnetic object therein, wherein opening of the cover dispenses a magnet adjacent the cover within the container.

Preferably, the spacer members are covered, at least in part, with a non-scratching material, so as to prevent or reduce, scratching or damage by the housing to the substrate. The spacer members may comprise an elongate projection along each edge of the housing extending beyond the surface, the elongate projections forming an open channel therebetween. Alternatively, the spacer members may comprise a plurality of legs on the housing extending beyond the surface, the legs defining an open channel therebetween.

According to another aspect of the invention, there is provided a locating and marking kit comprising: a locator and marking apparatus comprising a housing, a surface on the housing for holding a magnet to be dispensed, spacer members formed on the housing such that the surface for holding the magnet is maintained a substantially predetermined distance from a substrate on which the locating and marking apparatus is positioned; and a storage container being adapted to contain a plurality of magnets which can be removed therefrom and placed on the surface of the housing.

In yet another aspect of the invention, there is provided a method of locating and marking a wall using a locating marking apparatus, the method comprising: providing a housing with a surface on the housing for holding a magnet to be dispensed; inserting a magnet on the surface; forming spacer members on the housing such that the surface for holding the magnet is maintained a substantially predetermined distance from the wall on which the locating and marking apparatus is positioned; and moving the housing across a wall with the surface facing the wall such that the magnet is dispensed from the housing when a metal object in or behind the wall is present.

BRIEF DESCRIPTION OF THE DRAWINGS

In the drawings:

FIG. 8(d) is a top view of the container shown in FIG. 8a;

DETAILED DESCRIPTION OF THE INVENTION

Reference is now made to the drawings which illustrate various perspectives and views of the locator and marker device of the invention, the storage containers for use therewith, and the operation of the locator and marker of the invention over a wall surface, for the purposes of finding a metal fastener and dispensing a magnet on the wall at the point of the metal fastener.

Generally, unless the context indicates otherwise, the invention described may be used with respect to a structure comprising a wooden frame made up of individual, typically two-by-four, wood studs, which may be vertically, horizontally or diagonally arranged, the studs being held together by metal fasteners, and a wall being formed on the frame.

Figure 1:
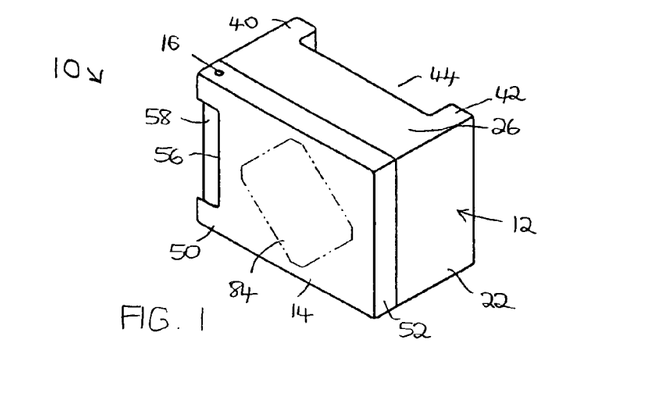
FIG. 1 is a perspective view of the metal locator and marker device in accordance with the invention.
Figure 2:
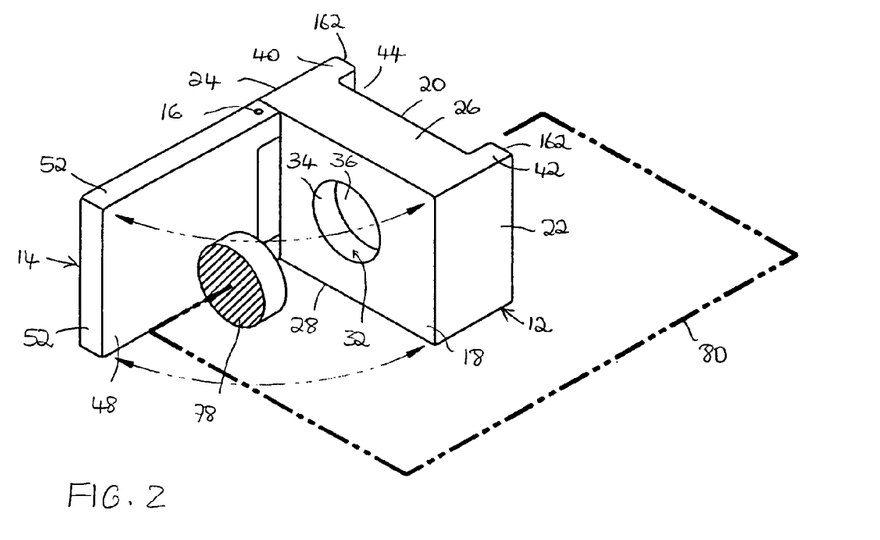
FIG. 2 is a perspective view of the locator and marker device as shown) in FIG. 1, in the open position, showing a magnet.

Reference is made to FIG. 1 of the drawings, which shows a locator and marker apparatus 10 of the invention. The locator and marker apparatus 10 comprises a housing 12 and a lid 14 mounted on the housing 12 by means of a pivot or hinge 16. The lid 14 can move between a closed position, as shown in FIG. 1, and an open position, as shown in FIG. 2, by rotating the lid 14 about the pivot 16.

The housing 12 itself comprises an upper surface 18, a lower surface 20, a pair of side walls 22 and 24, a top wall 26, and a bottom wall 28.

Within the upper surface 18, there is substantially centrally located a circular recess 32, the recess 32 having a circular side wall 34, and a base wall 36. Note that the circular recess 32 does not extend through the entire thickness of the housing 12, but only a portion thereof, and this can best be seen in FIG. 5 of the drawings.

A pair of legs 40 and 42 are formed on each side of the housing 12, and extend a short distance below the lower surface 20. The legs 40 and 42 define an open channel or space 44, the significance of which will become apparent in the further description of this invention.

The lid 14 has an inner surface 48, and an outer surface 50, and four side walls 52, of given thickness. The lid 14 has an indentation 56, which is adapted to receive a projection 58 on the housing 12, the projection 58 engaging the indentation 56, and both of these accommodate the pivot 16 so as to facilitate the opening and closing of the lid 14.

Figure 5:
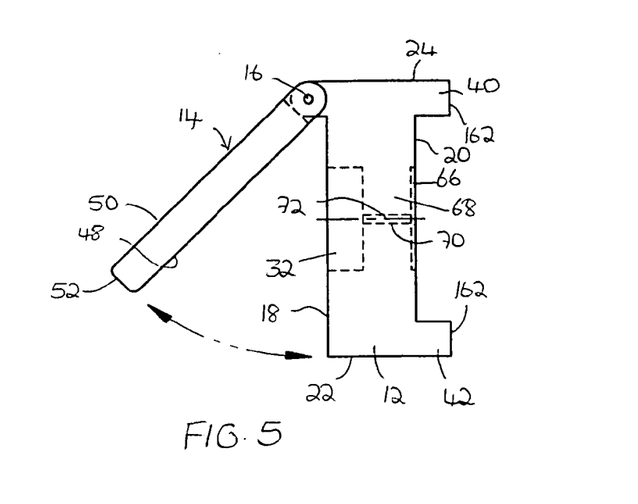
FIG. 5 is a side view of the locator and marker device of the invention.

As can be clearly seen in FIG. 5 of the drawings, the lower surface 20 of the housing 12 comprises a small recess 66, which is also circular, and more or less opposite the circular recess 32 on the other side of the housing 12. The small recess 66 has approximately the same diameter as the circular recess 32, and is also designed to received a magnet, as will be described, but to a much lesser depth than is the case with respect to the recess 32.

An intermediate wall 68 is located between the circular recess 32 and the small recess 66. A channel 70 is formed more or less transversely in the intermediate wall 68, and a small metal pin 72 or other metallic object is located within the channel 70. As will be described, the pin 72 facilitates retention of a magnet 78 in the circular recess 32, due to the magnetic forces between the magnet 78 and the pin 72. Possibly more importantly, the pin 72 facilitates retention of a magnet within the small recess 66. The small recess 66 itself, due to its dimensions, has much less of a hold for securing of the magnet 78 therein, for reasons that will become apparent below, and, in this instance, the pin 72 serves the important function of keeping the magnet in the small recess 66. It is, however, important that the pin 72 be of relatively small size so that no undue magnetic force will be established between it and the magnet 78. This is because, as will also be described, a metal fastener in a frame should attract the magnet when it is located in the small recess 66, and that this attraction and subsequent movement of the magnet 78 should not be impaired or prevented due to the magnetic forces between the magnet 78 and the pin 72.

Figure 3:
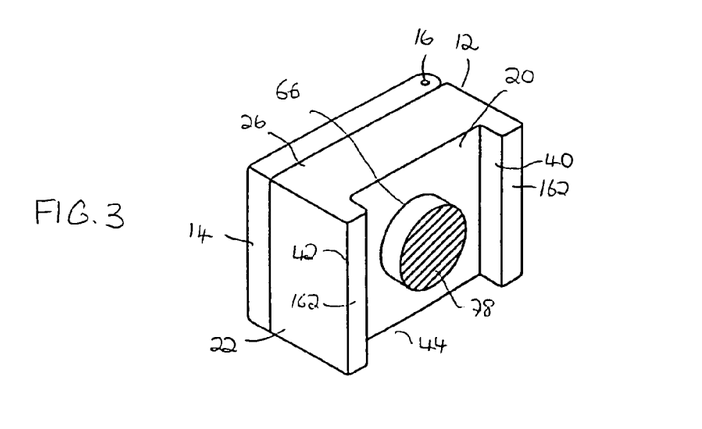
FIG. 3 is a perspective back view of the locator and marker device of the invention.
Figure 4:
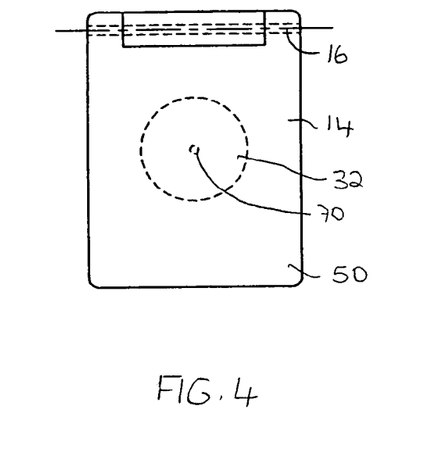
FIG. 4 is a front view of the locator and marker device of the invention.

In FIG. 3 of the drawings, a magnet 78 can be seen within the small recess 66. In this position, the location and marking device 10 of the invention is ready for use. In addition to a magnet in the small recess 66, a magnet 78 may also be stored within the circular recess 32 of the housing 12. When stored within the circular recess 32, the lid 14 can be closed so that a stored magnet 78 can be maintained within the housing 12 without falling out, ready for use when needed. When needed, the magnet 78 is removed from the circular recess 32, after the lid 14 has been opened, and moved around and placed in the small recess 66, which is the position ready for application of the magnet 78, to be described. This movement of the magnet 78 between the recesses 32 and 66 respectively can clearly be seen by the line representation 80 shown in FIG. 2 of the drawings.

Figure 6:
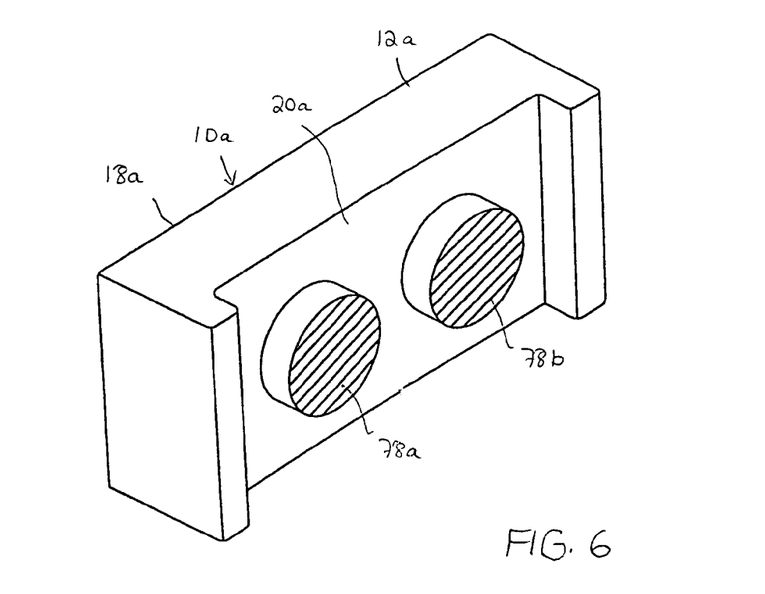
FIG. 6 is a back view of a locator and marker device in accordance with a further embodiment of the invention.

In FIG. 6, a further embodiment of the invention is illustrated. For the most part, FIG. 6 shows a location marker device 10a having a housing 12a. The configuration and structure of the housing 12a is similar to that in FIGS. 1 to 5 of the drawings, except that the housing 12a is expanded so as to receive two magnets 78a and 78b on the lower surface 28a of the housing 12a. In this way, the two magnets 78a and 78b are loaded for use, so that once one of the magnets has been dispensed for a metal marker or locator in a wall, there is no need to immediately load a further magnet, since it is already present and ready for use. The housing 12a may also have a lid as well as a pair of circular recesses 32 on an upper surface thereof, so that the locating and marking device 10a as shown in FIG. 6 of the drawings, holds four magnets, two in the storage position, and two ready fo application.

It will be seen that the outer surface 50 of the lid 14 may have written or graphic material 84 thereon. This may take the form of advertising, photographs, names or any other desired material.

Figure 7A:
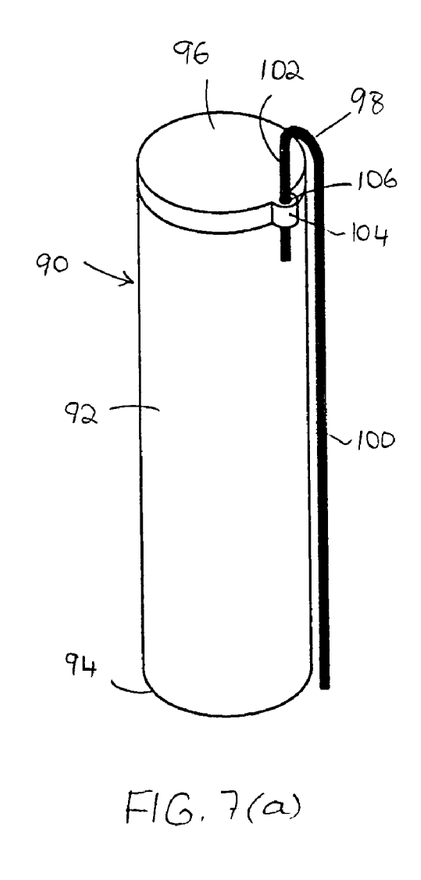
FIGS. 7(a), 7(b) and 7(c) show a magnet storage container in a closed, partially open, and open position respectively.
Figure 7B:
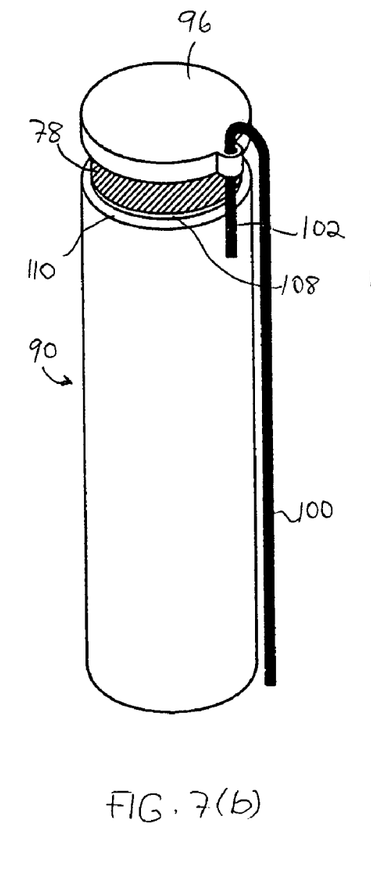
Figure 7C:
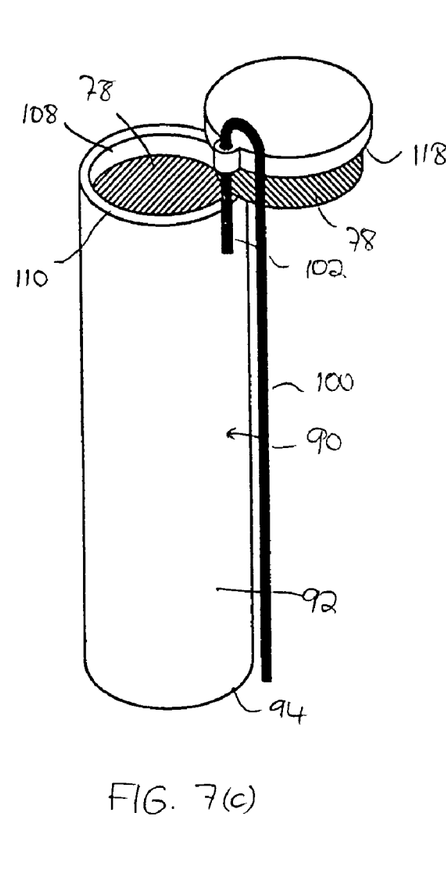
Figure 8A:
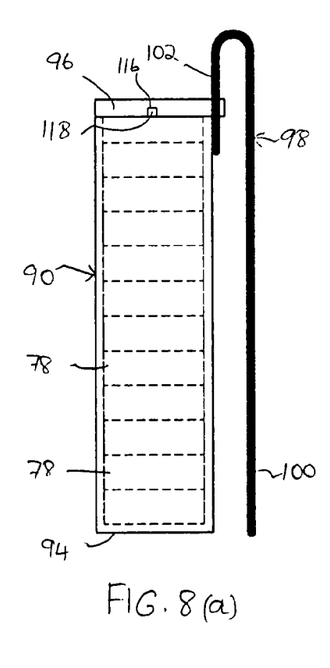
FIGS. 8(a), 8(b) and 8(c) are side, sectional views through the storage containers shown in FIGS. 7a, 7b and 7c respectively.
Figure 8B:
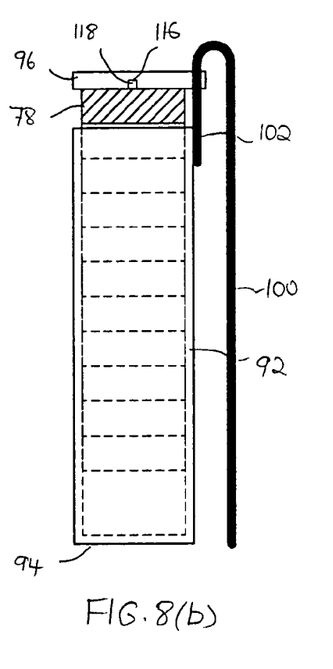
Figure 8C:
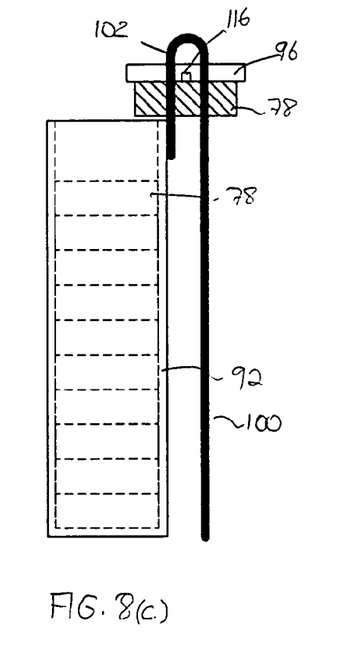
Figure 8D:
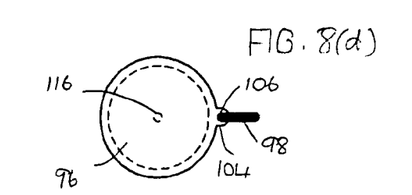
Figure 8E:
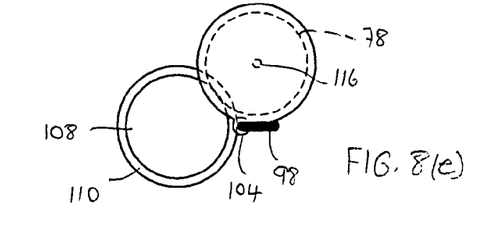
FIG. 8(e) is a top view of a container shown in FIG. 8(c)

In FIGS. 7(*a*), 7(*b*) and 7(*c*) of the drawings, there is shown a storage container 90 which stores magnets 78 for use in and with the locating and marking device 10 of the invention. The storage container 90 is generally cylindrical or tube-shaped, and comprises a circular side wall 92, a base 94, and removable cover 96. A metal or other type of rod 98 is attached to the side wall 92 or other part of the storage container 90, and comprises a shaft 100, and a cover holder 102. The cover 96 has a small projection 104, which has an aperture 106 therein, and the cover holder 102 is slidably accommodated within the aperture 106. In this way, the cover 96 is able to slide up and down on the cover holder 102.

FIG. 7(*a*), the storage container 90 is shown in the closed position, with the cover 96 covering the opening 108 of the storage container 90. In FIG. 7(*b*), the cover 96 is moved so that the projection 104 slides up the cover holder 102, and, in one embodiment, a magnet 78 may be attached to the lower surface of the cover 96, due to magnetic attraction between the metal component on the cover 96 and a magnet stored inside the storage container 90. The cover 96 is therefore moved up the cover holder 102 a sufficient distance so that the magnet 78 is above the rim 110 of the storage container 90. As seen in FIG. 7(*c*) of the drawings, the cover is then pivoted about the cover holder 102, and the magnet 78 may simply be removed from the undersurface of the cover 96. The cover 96 can then be replaced or moved to the closed position, shown in FIG. 7(*a*), at which point, if there is a magnetic component on the undersurface of the cover 96, a further magnet 78 stored in the storage container 90 will become attached thereto.

Note that the cover 96 moves away from the rim 110 of the storage container 90 a sufficient distance to move the top magnet, with the magnet attached to the cover 96, but the magnet 78 immediately below that will be, at least in part, below the rim 110 of the storage container 90. Thus, as the cover 96 is rotated as shown in FIG. 7(*c*), the top magnet 78 will become slidably separated from the one below.

FIGS. 8(*a*) to 8(*e*) show a cross-section of the storage container 90 shown in FIGS. 7(*a*), 7(*b*) and 7(*c*) of the drawings. Note that in FIGS. 8(*a*) to 8(*e*) of the drawings, the metal component, in the form of a very small metal piece, is located within a recess 116 on the undersurface 118 of the cover 96. FIGS. 8(*a*) to 8(*c*) also show a plurality of magnets stored one on top of the other in the inside of the storage container 90, and the movement of these magnets as one is dispensed for use.

Figure 9A:
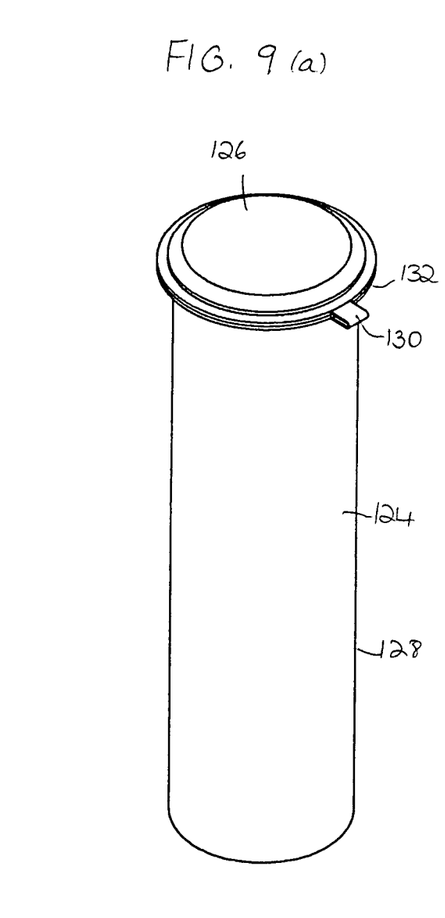
FIGS. 9(a) and 9(b) show a magnet storage container in accordance with a further embodiment of the invention, FIG. 9a showing a closed container and FIG. 9b showing an open container.
Figure 9B:
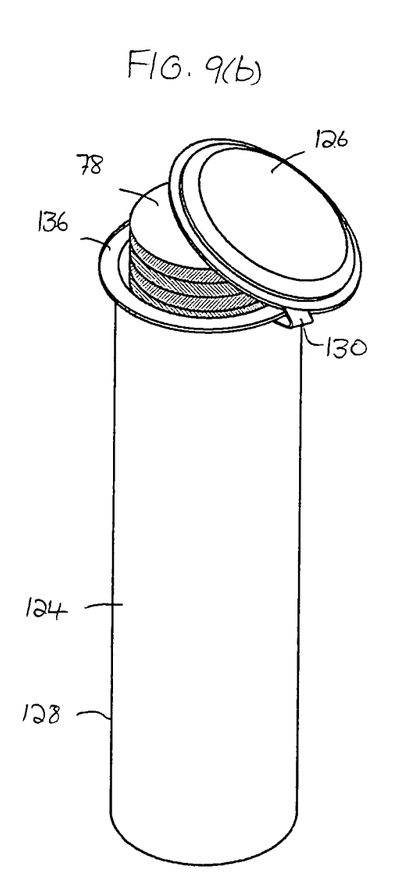

FIGS. 9(*a*) and 9(*b*) show a perspective view of a storage container 124 in accordance with another embodiment of the invention. The storage container 124 is also cylindrical and tubular in shape, but has a different lid or cover to that shown in the preceding drawings. In FIGS. 9(*a*) and 9(*b*), the storage container 124 comprises a cover 126, of generally circular or disc-like shape, which is connected to the side wall 128 of the storage container 124 by means of a small plastic tab 130. One end of the tab 130 is connected to the storage container 124, while the other is connected to the peripheral edge 132 of the cover 126. In conventional fashion, the cover 126 is able to pivot or move about the tab 130 between a closed position as shown in FIG. 9(*a*) and an open position, as shown in FIG. 9(*b*). Preferably, the cover 126 would engage in a snap-on fashion with an annular rim 136 at the top of the storage container 124 so that the cover 126 could be flipped open or closed, to provide access to, or seal off, a plurality of magnets 78 which are contained within the storage container 124.

Figure 10A:
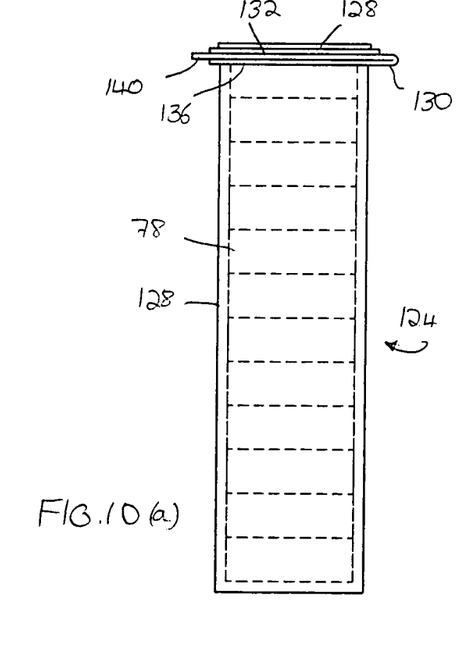
FIG. 10(a) shows a side sectional view of the container shown in FIG. 9(a) of the drawings.
Figure 10B:
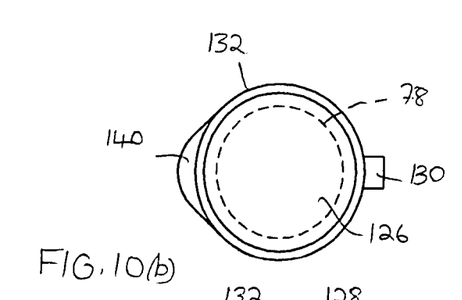
FIG. 10(b) shows a top view of the container shown in FIG. 10(a) of the drawings.

FIGS. 10(*a*) and 10(*b*) show a side section and a top view respectively of the storage container 124 illustrated in FIGS. 9(*a*) and 9(*b*) of the drawings. It will be seen, particularly in FIG. 10(*b*), that a small projection is formed along the peripheral edge 132 of the cover 126 at a point more or less opposite the tab 130. The projection 140 assists the user in opening and closing the cover 126, by providing leverage to the cover 126 which engages for opening and closing purposes.

FIGS. 11 to 14 of the drawings show the location and marker device 10 in use. With reference to these figures, there is shown a wooden beam 150 having therein a metal fastener 152. The wooden beam 150 represents a position inside the wall at 154. A wall sheet 156 is secured to the wooden beam 150, as well as many other wooden beams (not shown), providing an outside section at 158.

The locating and marking device 10 is used to determine the location of the wooden beam 150, by identifying the position of the metal fastener 152. It will be seen that the locating and marking device 10 has a magnet 78 located in the small recess 66, and the magnet 78 remains in the recess 66 due to the presence of the metal pin 72. There is just sufficient magnetic attraction between the magnet 78 and the pin 72 to prevent the magnet 78 from falling out of the recess 66. However, this magnetic force is generally not sufficient to prevent the magnet 78 from being discharged from the recess 66 in the presence of a larger metal object, more specifically, the metal fastener 152.

The locating and marking device 10 is placed against a wall so that the legs 40 and 42 are against the outer surface 160 of the wall sheet 56. Each leg 40 and 42 has a flat, smooth surface 162 which glides over the outer surface 160 of the wall sheet 156. The housing 12 may be held by the user between the thumb and fingers and gently moved over the outer surface 160. As soon as the housing 12 passes the point where a metal fastener 152 is located behind the wall, the magnetic attraction between the metal fastener 152 and the magnet 78 located in the recess 66 will cause the magnet 78 to be pulled out of the recess 66, and be held against the outer surface 160 of the wall sheet 156 as a result of this magnetic attraction. This entire process can take place as the housing 12 is moved somewhat slowly over the surface 160. The housing 12 is moved such that the magnet 78, once attracted by the metal fastener 152, can remain attached to the outer surface 160, since the housing 12 will pass right over the magnet 78 once it has detached from the housing 12. This is because the housing 12 is moved in the direction of the orientation of the channel or space 44. Therefore, there is no physical obstacle or structure on the housing 12, upon continued movement of the housing 12, which may cause the magnet 78 to become detached from the outer surface 160 when a metal fastener 152 has been detected.

Figure 13:
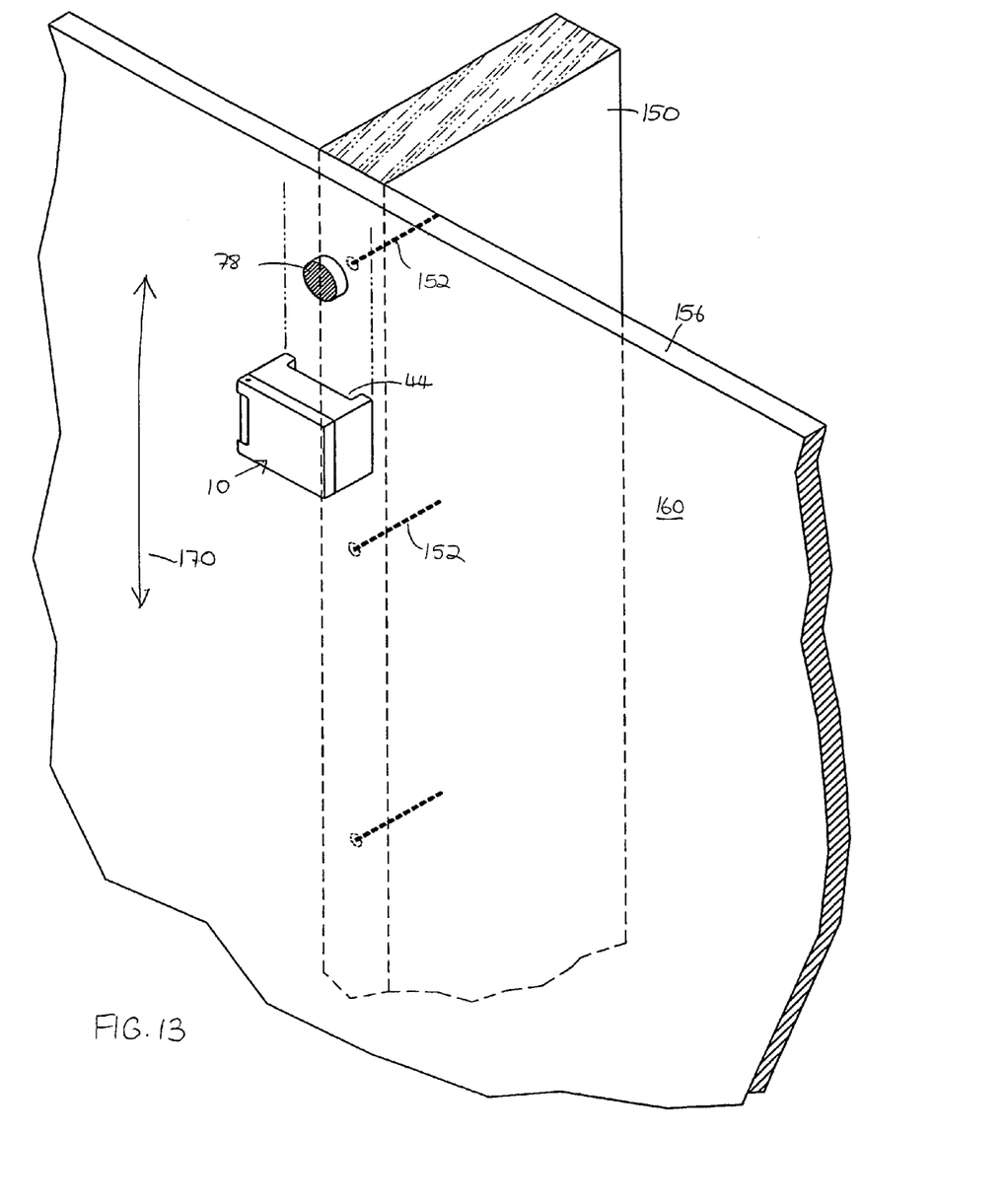
FIG. 13 is a perspective view showing the locator and marker device of the invention being moved over a wall in a substantially vertical orientation in order to detect the location of a metal fastener.
Figure 14:
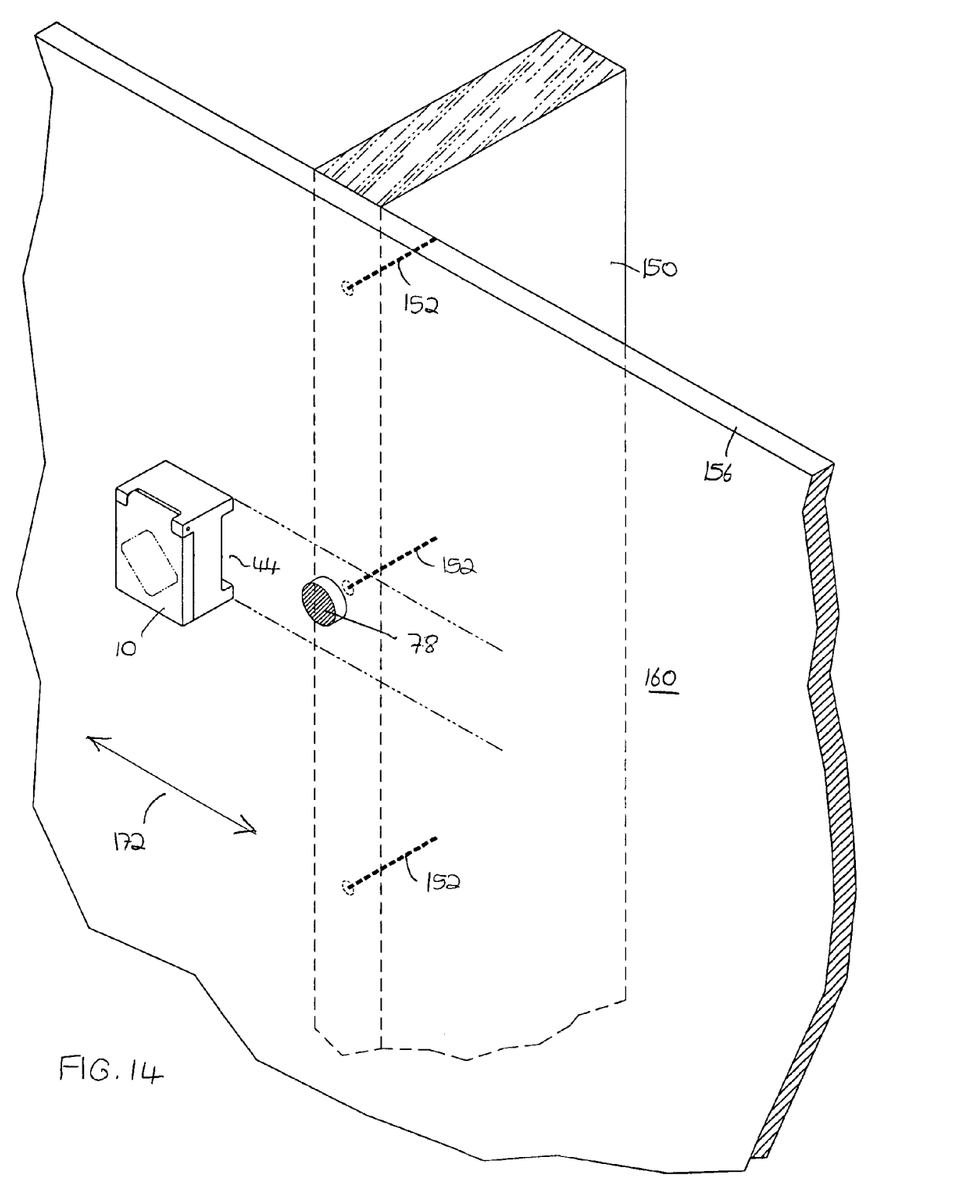
FIG. 14 is a view similar to that shown in FIG. 13, but wherein the locator and marker device of the invention is moved in a substantially horizontal orientation for the purposes of locating a metal fastener or object.

This arrangement can be clearly seen in FIGS. 13 and 14 of the drawings. With reference to FIG. 13, the housing 10 is generally moved in a vertical direction, indicated by arrow 170, so that the magnet 78, upon discharge from the recess 66 in the housing 10 will essentially move through the space 44, and allow the housing 10 to pass right over it. In FIG. 14 of the drawings, a similar situation is shown, but wherein the housing 10 is moved in a substantially horizontal direction, as indicated by arrow 172. It should, of course, be appreciated that while FIGS. 13 and 14 show movement of the housing 10 in the generally vertical and horizontal directions respectively, there is no reason why the housing 10 cannot be moved in any diagonal or other orientation. However, the housing 10 should preferably be moved in a relatively linear fashion, so that the magnet 78, when applied to the outer surface 160 of th wall sheet 156 at the point where a metal fastener 152 is found, will simply pass through this space 44 and not be dislodged by the movement of the housing 10.

Figure 11:
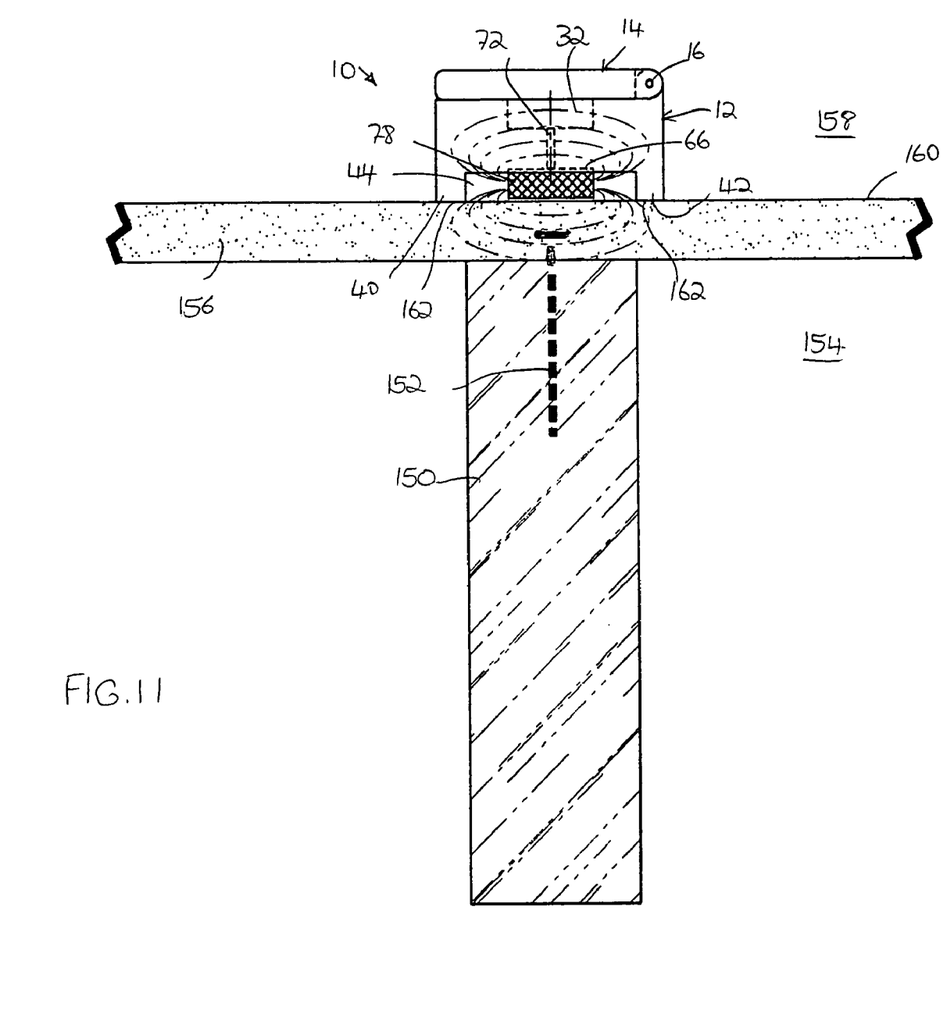
FIG. 11 is a cross-sectional view through a wall and frame, showing a metal object, and the location of a locator and marker device in accordance with the invention positioned on the wall.
Figure 12:
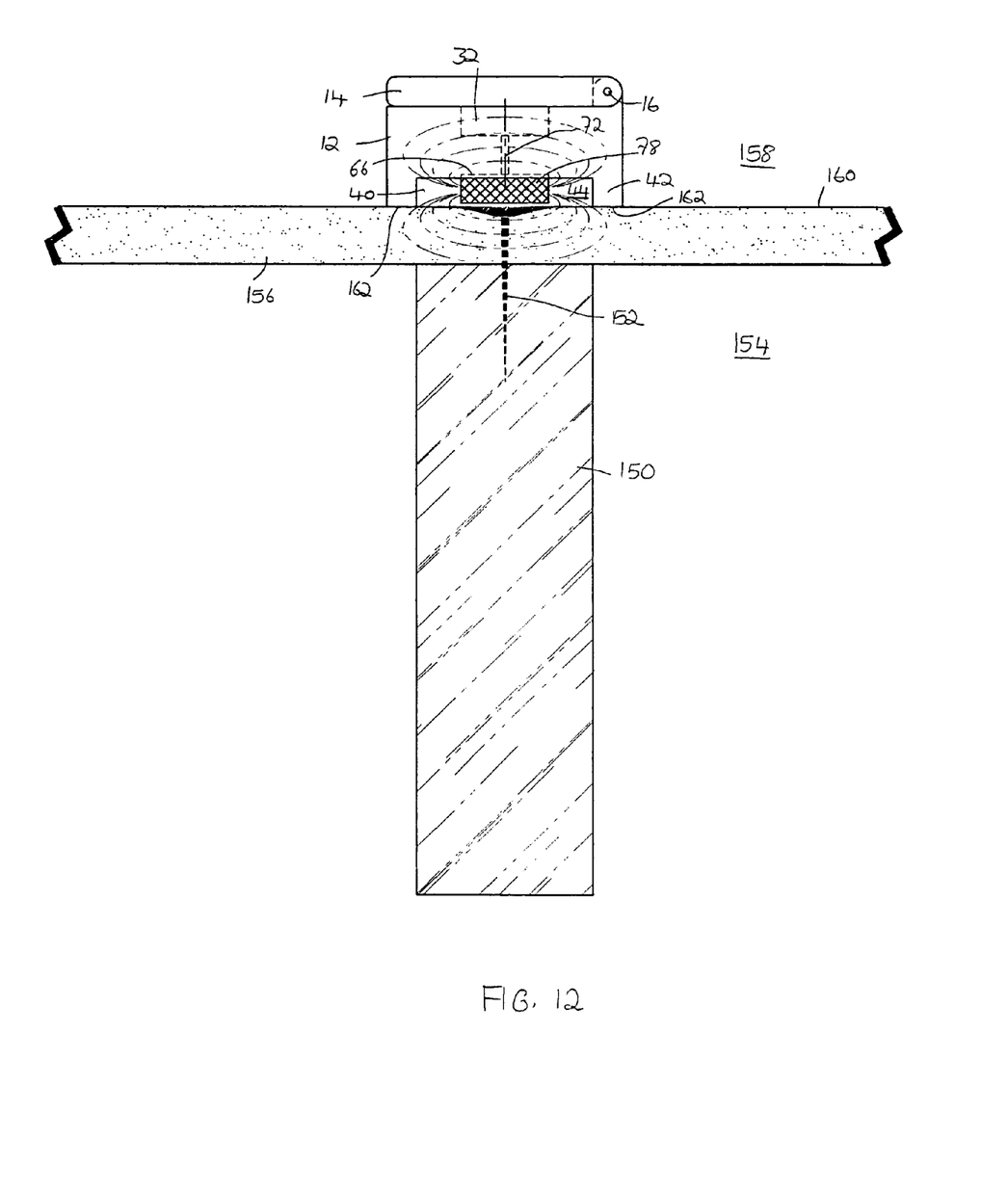
FIG. 12 is a view similar to that shown in FIG. 11, but showing a different type of magnetic fastener between the wall and the stud.

With reference to FIG. 12 of the drawings, there is shown a situation substantially similar to that in FIG. 11. In FIG. 11, the metal fastener 152 is shown extending far below the outer surface 160 of the wall sheet 156, and, in fact, is located near the wooden beam 150. In FIG. 12, the metal fastener 152 has a head 176 which extends just below the outer surface 160 of the wall sheet 156. In FIG. 12, a filler material 178 smooths out over the outer surface so that it is substantially flat for outward appearances. However, the action of the locator and marking device 10 of the invention is otherwise identical to that shown in FIG. 11 of the drawings, and the magnet 78 is discharged or dispensed as already described, where the metal fastener 152 is located.

The housing 12 may include a level indicator, either in conventional form, with a bubble marker, or have a laser level. Further, the locator and marker device 10 may incorporate a mechanism whereby an audible sound is given off when a metal fastener has been detected.

In one preferred form, the magnet 78 has a textured surface, or a covering, and this has several advantages. First, the magnet is easier to hold. Additionally, where the magnet has a soft covering, made of cloth, plastic, rubber or the like, it is less likely to scuff or in any way mark the wall on which is it dispensed.

The locating and marking device may also comprise a storage area for a pencil or other writing material or implement, as well as a slot or other guide mechanism whereby the pencil can be used in association with the locating and marking device to mark on the wall with a dot or other symbol the location at which a metal fastener has been found. The housing 12 itself may be comprised of a transparent, or partially transparent material, to help the user in determining exactly where a metal fastener, or a wooden beam, is located.

In addition, magnets of different size and strengths may be provided. For example, a stronger magnet may be used for the purposes of detecting and establishing the presence and location of a metal fastener in a wall. Once this has been found, a magnet of lesser strength can be used to replace the magnet of stronger force since it can already be seen where the metal fastener is located. This is useful where a user desires to find a number of metal markers or fasteners in a wall, and these can be quickly located with a stronger magnet, but identified on a more permanent basis with a smaller or one of lesser strength. For marking purposes, many or some of the magnets may be color-coded, or have other markings or graphics thereon. Further, the surface of the magnet may be treated at some point to enable the user to write on the magnet. The writing may be permanent, or such that it can be easily erased or washed off. Marking the magnet with written information may be useful for certain projects in order to provide guidance as to what should be installed or mounted at a particular point where the fastener or wood beam has been found.

The invention may also come as a kit, comprising the locating and marking device 10 as well as the storage container for magnets. These may, in some way, be attachable to each other so that they can be stored without becoming separated from each other and/or lost. In one preferred form, if the storage container and housing are attached to each other, this attachment can be released while the housing is operating to locate magnetic fasteners, and then reattached for the purposes of storing the device as a whole.

In another aspect of the invention, the surface 162 of the housing 12 may be coated with a soft fabric, felt, plastic or other material so that as the housing 12 is moved over a wall, it will not mark, scuff or otherwise damage the wall or remove paint of wall paper. Thus, the device of the invention preferably is able to move the metal marker in a manner where the housing, by virtue of the treated surfaces, does not damage the wall, and that the magnet, by virtue of the covering, also causes no damage. This is, of course, preferable where a particular wall may be used often to find metal markers in order to secure notices, photographs or the like to it. Such continued use will not, therefore, by virtue of the specially treated surfaces, have an lasting negative impact on the wall.

Further, there may be rollers or wheels on the surface 162 to enable easy movement of the housing. Preferably, such wheels or rollers are non-marking and will prevent scratching or scuffing.

The invention is not limited to the precise details, but many variations may be made within the scope of the invention. The housing may be of any suitable shape, and may have recesses or handles to facilitate the user holding the housing and moving it over a wall. Instead of the continuous legs 40 and 42, there may just be four cylindrical (or other shaped) legs at each corner, or along the lower surface 20. This would serve the purpose of keeping the magnets 78 held close to the wall, but allow movement of the housing not only in one plane, but in the horizontal and vertical plane as well, since the discharge magnet would be able to pass through passages nearly all around the housing 12.

The invention claimed is:

1. A locator and marking apparatus comprising:
   a housing;
   a surface on the housing for releasably holding a magnet to be discharged from the housing; and
   spacer members formed on the housing such that the surface for holding the magnet is maintained a substantially predetermined distance from a substrate on which the locating and marking apparatus is positioned, the magnet being completely separated from the housing upon discharge thereof on to the substrate.

2. A locating and marking apparatus as claimed in claim 1 wherein the housing further comprises a first recess on the surface, the first recess holding a portion of the magnet to be dispensed.

3. A locating and marking apparatus as claimed in claim 2 wherein the housing further comprises a second recess on an opposing surface, the second recess for holding a storage magnet.

4. A locating and marking apparatus as claimed in claim 1 wherein the spacer member comprises a plurality of legs on the surface of the housing for holding the magnet to be dispensed, the spacer members defining a through passage so that no obstacle is formed for a particular movement of the housing with respect to the magnet to be dispensed.

5. A locating and marking apparatus as claimed in claim 1 further comprising a small metal object in the housing near the surface for keeping a magnet to be dispensed in position on the surface prior to discharge thereof.

6. A locating and marking apparatus as claimed in claim 1 further comprising a lid on the housing, the housing having a storage area for a storage magnet, the lid movable between a closed position wherein the storage magnet is maintained within the housing, and an open position, wherein the storage magnet can be accessed.

7. A locating and marking apparatus as claimed in claim 1 wherein the surface on the housing comprises a plurality of recesses, each recess holding a magnet to be dispensed.

8. A locating and marking apparatus as claimed in claim 1 further comprising a magnet on the surface of the housing.

9. A locating and marking apparatus as claimed in claim 8 wherein the magnet has a substantially non-scratching covering over at least a portion of its surface.

10. A locating and marking apparatus as claimed in claim 8 wherein a plurality of magnets are provided, and at least some of the magnets are color-coded.

11. A locating and marking apparatus as claimed in claim 1 further comprising a storage container, the storage container being adapted to contain a plurality of magnets which can be removed therefrom and placed on the surface of the housing.

12. A locating and marking apparatus as claimed in claim 11 wherein the storage container is generally of tubular shape, and comprises a cover movable between an open position wherein magnets can be accessed, and a closed position where the magnets are sealed therein.

13. A locating and marking apparatus as claimed in claim 12 wherein the cover of the storage container contains a small magnetic object therein, wherein opening of the cover dispenses a magnet adjacent the cover within the container.

14. A locating and marking apparatus as claimed in claim 1 wherein the spacer members are covered, at least in part, with a non-scratching material, so as to prevent or reduce, scratching or damage by the housing to the substrate.

15. A locating and marking apparatus as claimed in claim 1 wherein the spacer members comprise an elongate projection along each edge of the housing extending beyond the surface, the elongate projections forming an open channel therebetween.

16. A locating and marking apparatus as claimed in claim 15 wherein the spacer members comprise a plurality of legs on the housing extending beyond the surface, the legs defining an open channel therebetween.

17. A locating and marking apparatus as claimed in claim 1 further comprising a level.

18. A locating and marking apparatus as claimed in claim 1 further comprising a sound alarm which is actuated when a metal fastener is located.

19. A locating and marking kit comprising:
   a locator and marking apparatus comprising a housing, a surface on the housing for holding a magnet to be dispensed, spacer members formed on the housing such that the surface for holding the magnet is maintained a substantially predetermined distance from a substrate on which the locating and marking apparatus is positioned; and a storage container being adapted to contain a plurality of magnets which can be removed therefrom and placed on the surface of the housing.

20. A method of locating and marking a wall using a locating marking apparatus, the method comprising:

providing a housing with a surface on the housing for holding a magnet to be dispensed;

inserting a magnet on the surface;

forming spacer members on the housing such that the surface for holding the magnet is maintained a substantially predetermined distance from the wall on which the locating and marking apparatus is positioned; and moving the housing across a wall with the surface facing the wall such that the magnet is dispensed from the housing when a metal object in or behind the wall is present.

* * * * *